US012614128B2

(12) United States Patent
Hiramatsu

(10) Patent No.: US 12,614,128 B2
(45) Date of Patent: Apr. 28, 2026

(54) ZONE ASSIGNMENT SYSTEM, ZONE ASSIGNMENT METHOD, AND RECORDING MEDIUM

(71) Applicant: Panasonic Intellectual Property Management Co., Ltd., Osaka (JP)

(72) Inventor: Katsuhiko Hiramatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 115 days.

(21) Appl. No.: 18/705,913

(22) PCT Filed: Nov. 18, 2022

(86) PCT No.: PCT/JP2022/042871
§ 371 (c)(1),
(2) Date: Apr. 29, 2024

(87) PCT Pub. No.: WO2023/100692
PCT Pub. Date: Jun. 8, 2023

(65) Prior Publication Data
US 2024/0420034 A1 Dec. 19, 2024

(30) Foreign Application Priority Data
Nov. 30, 2021 (JP) ................................. 2021-194617

(51) Int. Cl.
*G06Q 10/02* (2012.01)
*G06Q 50/06* (2024.01)
(52) U.S. Cl.
CPC ............. *G06Q 10/02* (2013.01); *G06Q 50/06* (2013.01)

(58) Field of Classification Search
None
See application file for complete search history.

(56) References Cited

U.S. PATENT DOCUMENTS

| | | | |
|---|---|---|---|
| 2008/0162198 A1* | 7/2008 | Jabbour | ............. G06Q 30/0645 705/5 |
| 2020/0219036 A1 | 7/2020 | Decamp et al. | |
| 2020/0302344 A1* | 9/2020 | Just | ................... G06Q 10/06312 |

FOREIGN PATENT DOCUMENTS

| | | |
|---|---|---|
| CN | 110363319 A | 10/2019 |
| EP | 3696472 A1 | 8/2020 |

(Continued)

OTHER PUBLICATIONS

International Search Report dated Feb. 7, 2023 issued in International Patent Application No. PCT/JP2022/042871, with English translation.

(Continued)

*Primary Examiner* — George Chen
(74) *Attorney, Agent, or Firm* — Rimon P.C.

(57) ABSTRACT

A zone assignment system includes a schedule obtainer that obtains usage schedules of users each indicating the intended use of a space by a user; an assigner that assigns each user a zone to use, based on the usage schedules obtained; and an outputter that outputs an assignment result indicating the zone assigned. The assigner assigns a first zone out of the zones to the user, among the users, who has a usage schedule indicating a first intended use as the intended use, and the assigner assigns a second zone out of the zones to the user, among the users, who has a usage schedule indicating a second intended use as the intended use, the second zone being a zone not adjacent to the first zone.

14 Claims, 6 Drawing Sheets

(56) References Cited

FOREIGN PATENT DOCUMENTS

| JP | 2013-246702 | A | 12/2013 |
| JP | 2015-060434 | A | 3/2015 |
| JP | 2017-016274 | A | 1/2017 |
| JP | 2017-117364 | A | 6/2017 |
| JP | 2020-135313 | A | 8/2020 |
| JP | 2021-168018 | A | 10/2021 |
| TW | 202032449 | A | 9/2020 |

OTHER PUBLICATIONS

Japanese Office Action dated Apr. 15, 2025 issued in the corresponding Japanese Patent Application No. 2023-564887.

* cited by examiner

FIG. 5

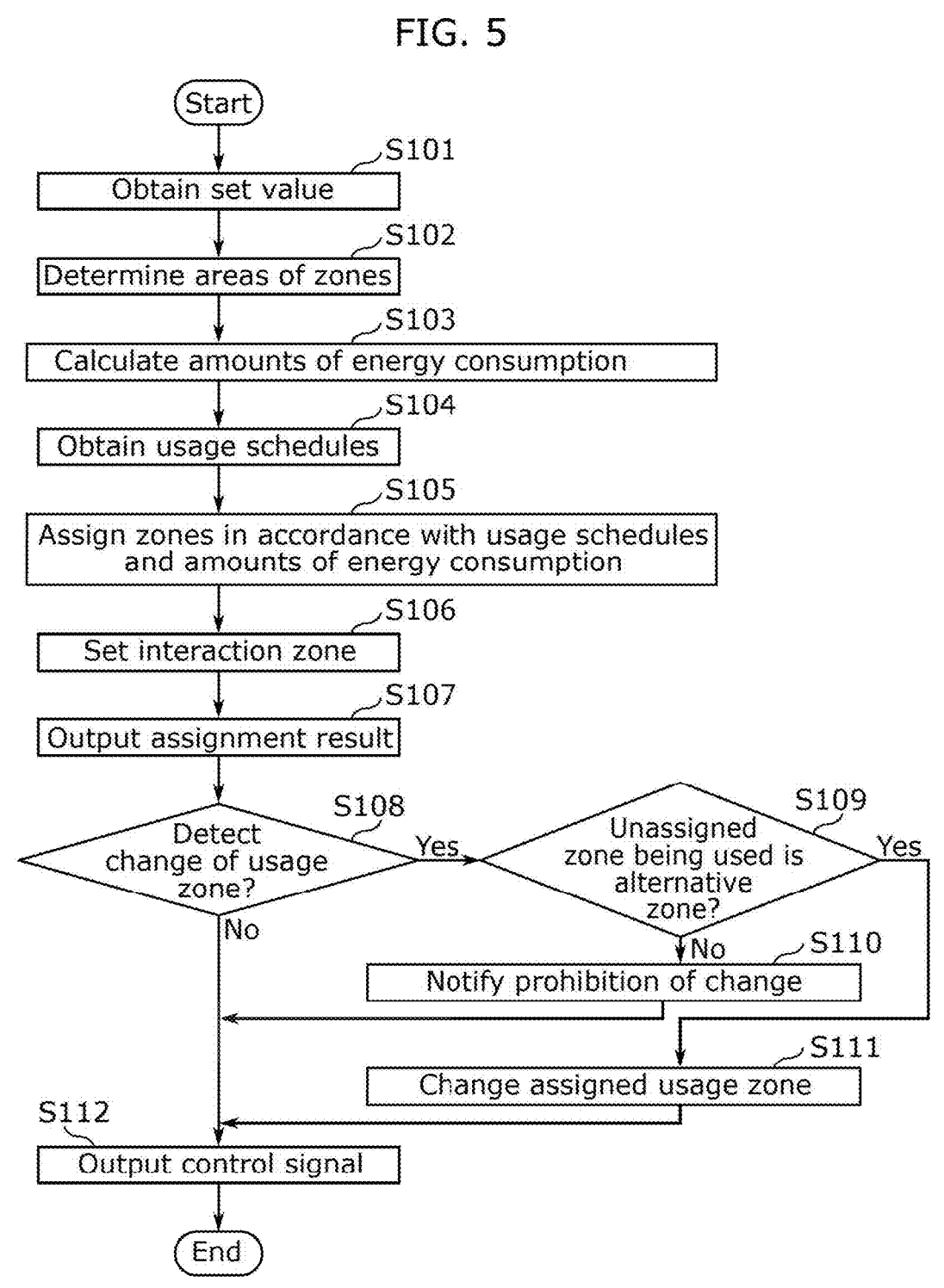

Start

S101
Obtain set value

S102
Determine areas of zones

S103
Calculate amounts of energy consumption

S104
Obtain usage schedules

S105
Assign zones in accordance with usage schedules and amounts of energy consumption S106
Set interaction zone S107
Output assignment result S108
Detect change of usage zone?

Yes → S109
Unassigned zone being used is alternative zone?

No

Yes

No → S110
Notify prohibition of change

S111
Change assigned usage zone

S112
Output control signal

End

ZONE ASSIGNMENT SYSTEM, ZONE ASSIGNMENT METHOD, AND RECORDING MEDIUM

CROSS-REFERENCE OF RELATED APPLICATIONS

This application is the U.S. National Phase under 35 U.S.C. § 371 of International Patent Application No. PCT/JP2022/042871, filed on Nov. 18, 2022, which in turn claims the benefit of Japanese Patent Application No. 2021-194617, filed on Nov. 30, 2021, the entire disclosures of which Applications are incorporated by reference herein.

TECHNICAL FIELD

The present disclosure relates to a zone assignment system and a zone assignment method for assigning one of the zones of a space to each of users before the users start using the space.

BACKGROUND ART

In recent years, the concept of unassigned seating, where employees do not have assigned desks, has been suggested in terms of, for example, improving flexibility in working style. In such a working style, each user can select a desired zone and work in the selected zone. In addition, a working style without going to the office, such as teleworking is becoming common. Patent Literature (PTL) 1 discloses, for example, a telework support device for supporting the working style of telework.

CITATION LIST

Patent Literature

[PTL 1] Japanese Unexamined Patent Application Publication No. 2021-168018

SUMMARY OF INVENTION

Technical Problem

Incidentally, with the new working style choice of telework, the number of people who come to the office varies depending on the day. In such a situation, in some cases, the space of the office was not appropriately used.

In view of this, the present disclosure aims to provide, for example, a zone assignment system that can provide more appropriate use of a space.

Solution to Problem

A zone assignment system according to one aspect of the present disclosure is a zone assignment system that assigns one of the plurality of zones of a space to each of users before the users start using the space. The zone assignment system includes: an obtainer that obtains the usage schedules of the users each indicating a date and time at which the user is scheduled to use the space and the intended use of the space by the user; an assigner that assigns the user a zone to use out of the plurality of zones, based on the usage schedules obtained; and an outputter that outputs an assignment result indicating the zone assigned. With regard to a target date and time at which to assign the zone, the assigner assigns a first zone out of the plurality of zones to a user, among the users, who has a usage schedule indicating a date and time overlapping the target date and time at which to assign the zone and indicating a first intended use as the intended use, and the assigner assigns a second zone out of the plurality of zones to a user, among the users, who has a usage schedule indicating a date and time overlapping the target date and time at which to assign the zone and indicating, as the intended use, a second intended use different from the first intended use, the second zone being a zone not adjacent to the first zone.

A zone assignment method according to another aspect of the present disclosure is a zone assignment method for assigning one of the plurality of zones of a space to each of users before the users start using the space. The zone assignment method includes: obtaining usage schedules of the users each indicating a date and time at which the user is scheduled to use the space and the intended use of the space by the user; assigning the user a zone to use out of the plurality of zones, based on the usage schedules obtained; and outputting an assignment result indicating the zone assigned. In the assigning, with regard to a target date and time at which to assign the zone, a first zone out of the plurality of zones is assigned to a user, among the users, who has a usage schedule indicating a date and time overlapping the target date and time at which to assign the zone and indicating a first intended use as the intended use, and a second zone out of the plurality of zones is assigned to a user, among the users, who has a usage schedule indicating a date and time overlapping the target date and time at which to assign the zone and indicating, as the intended use, a second intended use different from the first intended use, the second zone being a zone not adjacent to the first zone.

Furthermore, a still another aspect of the present disclosure can be embodied as a program for causing a computer to execute the above control method. Alternatively, a still another aspect of the present disclosure can be embodied as a non-transitory computer-readable recording medium having recorded thereon the program.

Advantageous Effects of Invention

With the use of the present disclosure, a space can be used more appropriately.

BRIEF DESCRIPTION OF DRAWINGS

FIG. 5 is a flowchart illustrating an example of operation of the zone assignment system according to the embodiment.

DESCRIPTION OF EMBODIMENTS

Figure 1A:
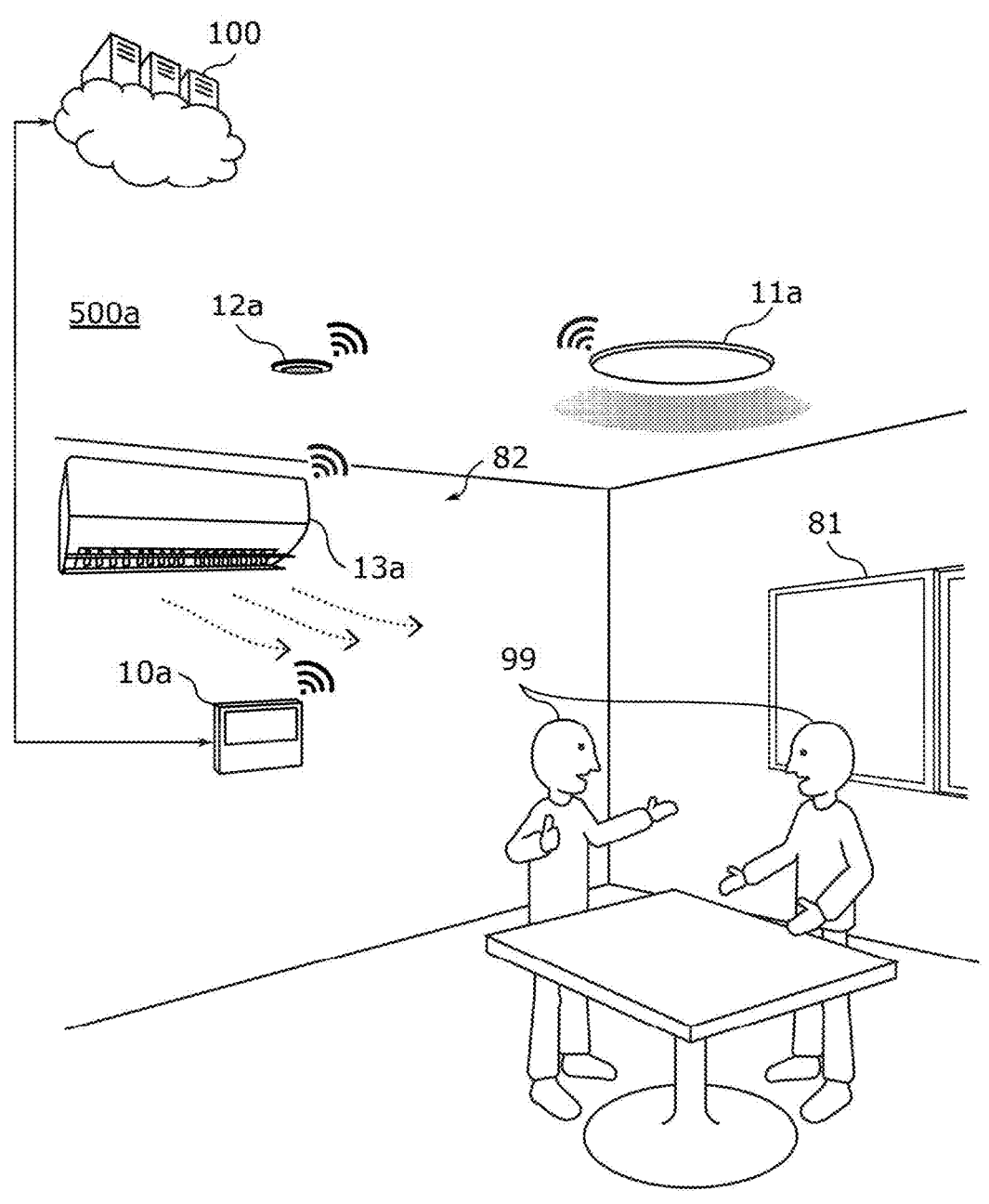
FIG. 1A is a first overview drawing illustrating an example of use of a zone assignment system according to an embodiment.

A zone assignment system according to the embodiment in the present disclosure is described below in detail with reference to the drawings. It should be noted that the embodiment described below indicates a specific example of the present disclosure. Thus, the numerical values, shapes, materials, structural elements, arrangement and connection of the structural elements, steps, order of the steps, and other details described below in the embodiment are mere example, and therefore do not intend to limit the present disclosure. Accordingly, among the structural elements according to the embodiment, those not recited in the independent claims are described as optional structural elements.

Furthermore, the drawings are schematic views and are not necessarily precisely drawn. Thus, for example, the scales used in the drawings are not necessarily the same. Furthermore, in the drawings, substantially the same elements are assigned the same reference sign, and overlapping explanations are omitted or simplified.

Embodiment

Overview

Figure 1B:
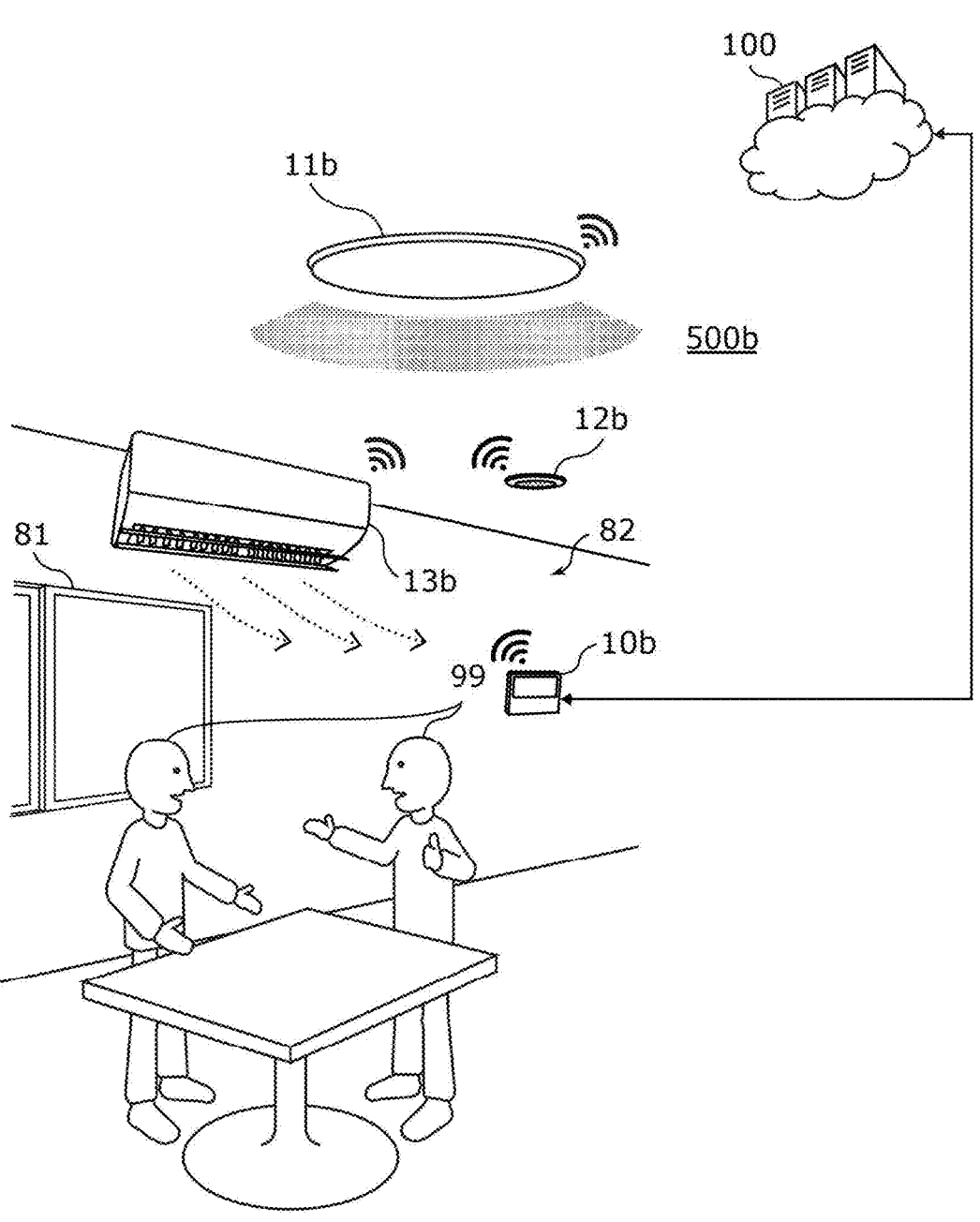
FIG. 1B is a second overview drawing illustrating an example of use of the zone assignment system according to the embodiment.
Figure 2:
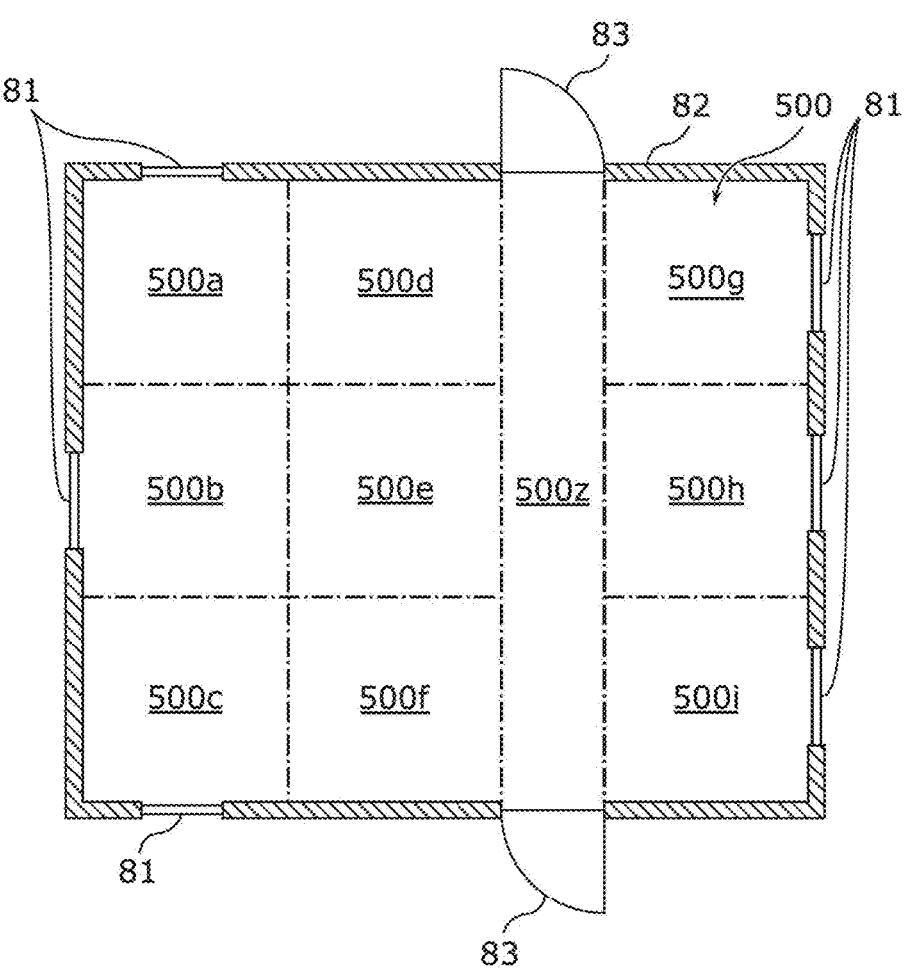
FIG. 2 is a plan view illustrating an example of a space for which zone assignment is performed by the zone assignment system according to the embodiment.

An overview of a zone assignment system according to an embodiment is described with reference to FIGS. 1A, 1B, and 2. FIG. 1A is a first overview drawing illustrating an example of use of the zone assignment system according to the embodiment. FIG. 1B is a second overview drawing illustrating an example of use of the zone assignment system according to the embodiment. FIG. 2 is a plan view illustrating an example of a space for which zone assignment is performed by the zone assignment system according to the embodiment. FIGS. 1A and 1B illustrate situations in which users 99 are using space 500 (see FIG. 2 described later). In particular, FIG. 1A illustrates a situation of zone 500a included in space 500. Furthermore, FIG. 1B illustrates a situation of zone 500b included in space 500. Furthermore, as illustrated in FIG. 2, in the embodiment, space 500 includes the nine zones: zone 500a, zone 500b, zone 500c, zone 500d, zone 500e, zone 500f, zone 500g, zone 500h, and zone 500i. As described later, the area of space 500 is inalterable, whereas the area of each zone is alterable. Thus, space 500 may include at least two and at most nine zones and may include more than nine zones.

In the embodiment, space 500 is divided into zone 500a, zone 500b, . . . and zone 500i in this way, and from the viewpoint of appropriate use of space 500, each user 99 of space 500 is assigned the zone to be used by the user. Then, zone assignment system 300 (see FIG. 3 described later) that enables more appropriate use of space 500 by letting users 99 use the assigned zones is described.

Appropriate use of space 500, here, is use of space 500 which contributes to reduction in the amount of energy consumed in space 500 when space 500 is used. In other words, by using space 500 appropriately in accordance with determination by zone assignment system 300, energy consumed when using space 500 can be maintained relatively low.

It should be noted that, here, energy means electrical energy. However, energy may be considered as energy when using gas or liquid fuel. For instance, in the embodiment, the amount of electrical energy consumed to operate an air-conditioning device is mentioned as the amount of energy consumption. However, the amount of kerosene fuel consumed by using, for example, an oil heater instead of the air-conditioning device may be considered as the amount of energy consumption. Furthermore, depending on the circumstances, electrical energy also includes clean energy and non-clean energy. Here, clean energy is generated by a method with low $CO_2$ emissions by using non-fossil energy. Non-clean energy is generated by a method with high $CO_2$ emissions by using fossil energy. If the proportions of consumed energy are available, that is, if energy is convertible into the amount of $CO_2$ emissions, the amount of energy consumption equivalent to clean energy calculated in terms of the amount of $CO_2$ emissions may be used as the amount of energy consumption in the embodiment.

As illustrated in FIG. 1A, in the embodiment, the spatial environment of zone 500a is controlled by first lighting device 11a, first ventilating device 12a, and first air-conditioning device 13a. First lighting device 11a, first ventilating device 12a, and first air-conditioning device 13a are examples of environment control devices that consume energy when the zone is used. It should be noted that only one type of environment control device may be provided. In this case, just one of first lighting device 11a, first ventilating device 12a, and first air-conditioning device 13a may be provided.

As illustrated in FIG. 1B, in the embodiment, the spatial environment of zone 500b is controlled by second lighting device 11b, second ventilating device 12b, and second air-conditioning device 13b. Second lighting device 11b, second ventilating device 12b, and second air-conditioning device 13b are examples of environment control devices. It should be noted that only one type of environment control device may be provided. In this case, just one of second lighting device 11b, second ventilating device 12b, and second air-conditioning device 13b may be provided.

Space 500 includes a total of nine zones, which are similar to those illustrated in FIGS. 1A and 1B. As illustrated in FIG. 2, space 500 is separated from the outside by wall 82. The users of space 500 can enter and exist space 500 through doors 83. Heat does not flow into space 500 from the outside through wall 82, and the outside light is not taken in through wall 82. However, to be precise, some heat may flow in, and some outside light may be taken in. However, these cases are ignored here. It should be noted that an energy consumption calculator, which is described later, may calculate the amount of energy consumption in consideration of outside heat to flow in through wall 82 and outside light to be taken in through wall 82. Meanwhile, windows 81 are provided on wall 82. Some heat flows into space 500 from the outside through windows 81, and some outside light is taken into space 500 through windows 81. Thus, effects of the outside heat and outside light on each zone differ, depending on the presence or absence of window 81 and the orientation of window 81 in the zone.

For this reason, when users 99 use only one or more zones of space 500, depending on which zone(s) are used by users 99, that is, which zone(s) are assigned to users 99, even if the same number of zones are used, there will be a difference in the total value of the energy consumption in the entirety of space 500. Accordingly, in zone assignment system 300, zones to be used by users 99 are determined and assigned to users 99 so that a smaller total value of the energy consumption in the entirety of space 500 is obtained. Furthermore, the intended use of space 500 differs among users 99.

For instance, one day, user 99 may want to do some personal work in space 500 without interacting with other users 99. The intended use of space 500 may be referred to as solowork. Meanwhile, on the same day, another user 99 may want to do cooperative work with yet another user 99 while communicating with each other. The intended use of space 500 may be referred to as group work. It should be noted that the above-mentioned "work" is an example of a use of space 500. Uses of space 500 include various uses of space 500, such as "studying", "manufacturing of articles", and "other tasks".

It is rare for users 99 using the space for solowork to directly utter words. Thus, a zone being used by users 99 for solowork is a relatively quiet zone. Meanwhile, users 99 using the space for group work are often asked to actively speak out. Thus, a zone being used by users 99 for group work is a relatively noisy zone.

From the perspective of reducing the energy consumption in the entirety of space 500, it is required that users 99 use a portion of space 500 that is as small as possible, and that a lighting device, a ventilating device, and an air-conditioning device be caused to work concentratedly for the portion of space 500. To achieve this, one zone may be assigned to all users 99, or one of adjacent zones may be assigned to each user 99. However, as described above, the intended use of space 500 may differ among users 99, and it may cause a situation in which users 99 using space 500 for different intended uses give negative effects to each other. As an example of the situation, users 99 using space 500 for solowork get distracted by the voices of users 99 using space 500 for group work.

Thus, in the embodiment, all of users 99 who share the same intended use of space 500, such as solowork, are assigned the same zone or are each assigned one of adjacent zones. Then, all of users 99 who share the same intended use of space 500 different from solowork, such as group work, are assigned one or more zones not adjacent to the zone assigned to users 99 who intend to use for solowork. In the example in FIG. 2, for instance, users 99 who intend to use for solowork are assigned zone 500a and zone 500b, and users 99 who intend to use for group work are assigned zone 500g and zone 500h. By reducing, in the above manner, the possibility of users 99 who are using space 500 for different uses giving negative effects to each other, zone assignment system 300 performs zone assignment to enable each user 99 to perform their task smoothly.

It should be noted that in FIG. 2, passage 500z is provided between zone 500d and zone 500g, between zone 500e and zone 500h, and between zone 500f and zone 500i. If passage 500z has a sufficient width (length in a direction orthogonal to a direction in which passage 500z extends), two zones with passage 500z being present therebetween in the width direction can be considered as spaced apart from each other. That is, the two zones with passage 500z being present therebetween in the width direction are not adjacent to each other. Thus, zone assignment system 300 may assign zone 500d to users 99 who intend to use for solowork and zone 500g to users 99 who intend to use for group work. Thus, zones that are not adjacent to each other may be zones with another zone being present therebetween or zones with a space such as a common space different from the zones being present therebetween.

The above-mentioned same intended use means the same category out of the categories: the solowork use, the group work use, and other intended uses. By referring to, for example, a usage schedule, which is described later, zone assignment system 300 identifies the intended use by user 99 from, for example, character information described in the schedule of user 99, with the use of, for example, an intended use determination model trained in advance by machine learning. Then, zone assignment system 300 makes use of the identified intended use in zone assignment.

Furthermore, the intended use may be directly added to the usage schedule of user 99. For instance, when inputting their usage schedule, user 99 selects one from solowork, group work, and other usage options. Then, in assigning a zone, zone assignment system 300 may use the intended use included in the usage schedule. Thus, the intended use of space 500 by user 99 is indicated by the space usage schedule of user 99.

Accordingly, zone assignment system 300 in the embodiment assigns zones so that users 99 can perform their tasks smoothly. At this time, zone assignment system 300 assigns zones that form an appropriate combination in terms of the energy consumption, that is, a combination with relatively small energy consumption, the combination being a combination of zones assigned to users 99. Accordingly, zone assignment system 300 can perform appropriate zone assignment that enables both smooth performance of tasks by users 99 and relatively small energy consumption.

Furthermore, in the embodiment, a lighting device, a ventilating device, and an air-conditioning device are provided in each of zone 500a, zone 500b, ... and zone 500i. However, if for example one device can control the respective spatial environments of the zones, the environment control devices need not be provided in each of the zones. Thus, even in a space where just one environment control device is provided, zone assignment can be performed appropriately.

In the embodiment, an example in which a lighting device, a ventilating device, and an air-conditioning device are included as environment control devices is described. In addition to the above-mentioned devices, any devices, such as an audio device, a humidifier, a perfume component generator, and an air purifier, can be used as environment control devices, as long as the devices can control one or more factors of the spatial environment of space 500.

[Configuration]

Figure 3:
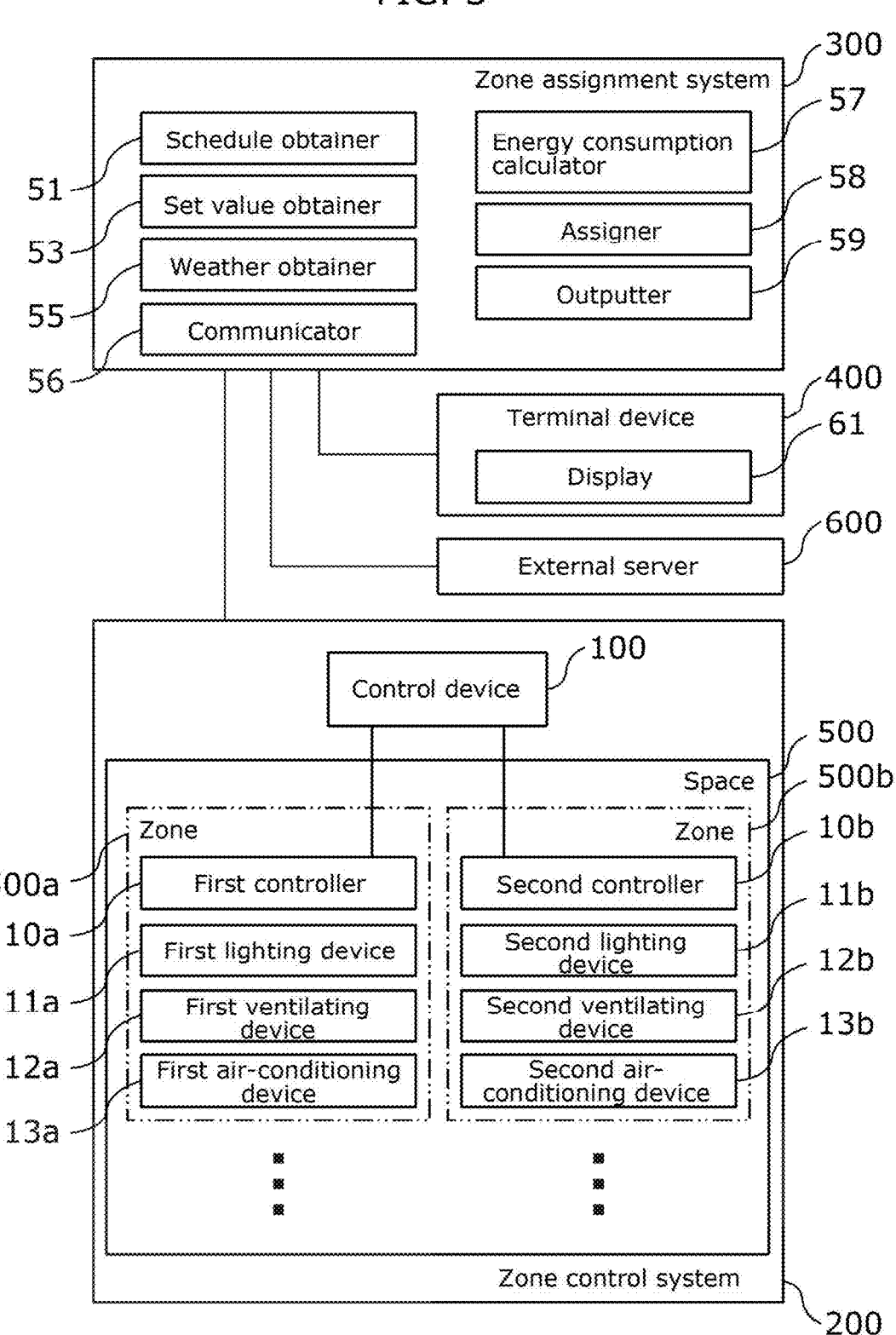
FIG. 3 is a block diagram illustrating a functional configuration of the zone assignment system according to the embodiment and other elements.

Configurations of zone control system 200, zone assignment system 300, and other elements are described below with reference to FIG. 3 together with FIGS. 1A, 1B, and 2. FIG. 3 is a block diagram illustrating functional configurations of the zone assignment system according to the embodiment and other elements. Zone control system 200 in the embodiment includes control device 100 and environment control devices provided in each of the zones of space 500.

In zone 500a, first lighting device 11a, first ventilating device 12a, and first air-conditioning device 13a are connected to control device 100 via first controller 10a. Control device 100 is embodied as, for example, a cloud server or an edge server, and can be provided in a place physically distant from space 500 or provided inside space 500. First controller 10a and control device 100 are connected to each other in communication via a wide area network, such as the Internet. However, a connection method and a communication method are not limited to the above methods.

First controller 10a is a device for communicably connecting between control device 100 and first lighting device 11a, first ventilating device 12a, and first air-conditioning device 13a. For instance, first controller 10a receives, for example, a signal from control device 100 via a communication line and transmits the signal to first lighting device 11a, first ventilating device 12a, and first air-conditioning device 13a by wireless communication. Furthermore, first controller 10a receives, for example, signals from first lighting device 11a, first ventilating device 12a, and first air-conditioning device 13a by wireless communication and transmits the signals to control device 100 via the communication line. It should be noted that when each of first lighting device 11a, first ventilating device 12a, and first air-conditioning device 13*a* can directly communicate with control device 100, first controller 10*a* need not be included.

Control device 100 transmits operation parameters for operating first lighting device 11*a*, first ventilating device 12*a*, and first air-conditioning device 13*a* to the respective devices via first controller 10*a*. This enables the respective devices to operate in accordance with the operation parameters transmitted from control device 100.

First lighting device 11*a* is a device for controlling the brightness of zone 500*a*, which is a factor of the spatial environment of zone 500*a*. First lighting device 11*a* has a brightness adjustable lighting device that can obtain a numerical value specifying a brightness from the received operation parameter and adjust the luminance according to the brightness corresponding to the numerical value. It should be noted that first lighting device 11*a* may be a device for controlling the color temperature of zone 500*a*, which is a factor of the spatial environment of zone 500*a*. In this case, first lighting device 11*a* obtains a numerical value specifying a color temperature from the received operation parameter and adjusts the color of light according to the color temperature corresponding to the numerical value.

First ventilating device 12*a* is a device for controlling the amount of air exchange mainly in zone 500*a*, which is a factor of the spatial environment of zone 500*a*. First ventilating device 12*a* can obtain a numerical value specifying the amount of air exchange, from the received operation parameter, and discharge the air in accordance with the amount of air exchange corresponding to the numerical value.

First air-conditioning device 13*a* is a device for controlling the temperature of zone 500*a*, which is a factor of the spatial environment of zone 500*a*. First air-conditioning device 13*a* can obtain a numerical value specifying a temperature from the received operation parameter and cool or warm zone 500*a* until the target temperature is reached, by controlling the air flow rate of a fan so that the zone temperature reaches the temperature corresponding to the numerical value. It should be noted that first air-conditioning device 13*a* may be a fan device that controls the volume of air flowing in zone 500*a*, which is a factor of the spatial environment of zone 500*a*. In this case, first air-conditioning device 13*a* obtains, from the received operation parameter, a numerical value specifying the volume of air flowing in the zone and controls the fan to achieve the volume of air flowing in the zone corresponding to the numerical value.

In zone 500*b*, second lighting device 11*b*, second ventilating device 12*b*, and second air-conditioning device 13*b* are connected to control device 100 via second controller 10*b*. Second controller 10*b* and control device 100 are connected to each other in communication via the wide area network, such as the Internet. However, a connection method and a communication method are not limited to the above methods.

Second controller 10*b* is a device for communicably connecting between control device 100 and second lighting device 11*b*, second ventilating device 12*b*, and second air-conditioning device 13*b*. For instance, second controller 10*b* receives, for example, a signal from control device 100 via a communication line and transmits the signal to second lighting device 11*b*, second ventilating device 12*b*, and second air-conditioning device 13*b* by wireless communication. Furthermore, second controller 10*b* receives, for example, signals from second lighting device 11*b*, second ventilating device 12*b*, and second air-conditioning device 13*b* by wireless communication and transmits the signals to control device 100 via the communication line. It should be noted that when each of second lighting device 11*b*, second ventilating device 12*b*, and second air-conditioning device 13*b* can directly communicate with control device 100, second controller 10*b* need not be included.

Control device 100 transmits operation parameters for operating second lighting device 11*b*, second ventilating device 12*b*, and second air-conditioning device 13*b* to the respective devices via second controller 10*b*. This enables the respective devices to operate in accordance with the operation parameters transmitted from control device 100.

Second lighting device 11*b*, second ventilating device 12*b*, and second air-conditioning device 13*b* are similar to first lighting device 11*a*, first ventilating device 12*a*, and first air-conditioning device 13*a*, respectively. As such, explanations for second lighting device 11*b*, second ventilating device 12*b*, and second air-conditioning device 13*b* are omitted here by the provision of the above explanations for first lighting device 11*a*, first ventilating device 12*a*, and first air-conditioning device 13*a*. Furthermore, a lighting device, a ventilating device, an air-conditioning device, and a controller are provided in the same manner in each of zone 500*c*, zone 500*d*, . . . and zone 500*i*. Then, by communicating with control device 100 via the controller, the lighting device, the ventilating device, and the air-conditioning device can perform transmission and reception of a signal with control device 100. For instance, the lighting device, the ventilating device, and the air-conditioning device can operate in accordance with the operation parameters transmitted from control device 100. Thus, the spatial environments of the zones of space 500 can be individually controlled. However, when the number of zones is changed, the target zones that the environment control devices control may change. That is, an environment control device that had belonged to a zone before the change of the number of zones may belong to another zone after the change of the number of zones.

Zone assignment system 300 assigns, on the basis of the usage schedule of user 99, a zone to be used by user 99. In addition, zone assignment system 300 obtains, for example, the performances of the environment control devices and calculates energy consumption. Zone assignment system 300 is connected to zone control system 200 in order to control operation of the environment control devices in the assigned zone. Zone assignment system 300 is also connected to a portable terminal, such as the smartphone or the tablet terminal of user 99, terminal device 400, such as a PC, provided to each of the zones, and external server 600.

Zone assignment system 300 includes schedule obtainer 51, set value obtainer 53, weather obtainer 55, communicator 56, energy consumption calculator 57, assigner 58, and outputter 59. Zone assignment system 300 is embodied as, for example, a program executed using a processor, such as a cloud server or an edge server, and memory. Thus, zone assignment system 300 is embodied as a program that is executed using the processor and the memory and designed to implement a function corresponding to each of schedule obtainer 51, set value obtainer 53, weather obtainer 55, communicator 56, energy consumption calculator 57, assigner 58, and outputter 59.

Schedule obtainer 51 is a processing unit that obtains the usage schedule of user 99 from a schedule management server that is a kind of external server 600. Users 99 enter their usage schedules into the schedule management server, which makes it possible to obtain, all at once, the usage schedules of users 99 who intend to use space 500 at a particular date and time. For instance, schedule obtainer 51 obtains the usage schedules of users 99 that fall under a target date and time at which to assign zones. The target date and time at which to assign zones represents a period having a unit time length, such as a one-hour unit, a four-hour unit, an eight-hour unit, or a 12-hour unit. Schedule obtainer 51 obtains all the usage schedules of the users each indicating a usage date and time which is at least partially included in the above period. The manager of, for example, zone assignment system 300 can set the unit time of the target date and time at which to assign zones, by inputting an appropriate numerical value. For instance, in addition the above unit time, longer lengths of unit time, such as a one-day unit, a one-week unit, and a one-month unit, may be set.

The usage schedule includes information regarding a (usage) date and time at which user 99 is scheduled to use space 500 and information regarding the intended use of space 500 by user 99. When the usage date and time indicated by the usage schedule continues over two or more consecutive sets of target date and time at which to assign zones, the usage schedule is obtained for each of the two or more consecutive sets of target date and time at which to assign zones.

Set value obtainer 53 is a processing unit that obtains a set value regarding the area of each of the zones. Set value obtainer 53 reads out the set value stored in, for example, the memory of zone assignment system 300, thereby obtaining the set value. The set value can be stored by the manager of, for example, zone assignment system 300 inputting an appropriate numerical value. By re-inputting the set value at a given timing, the manager of, for example, zone assignment system 300 can update the stored set value at a given timing.

The maximum capacity of each of the zones (the number of persons that can be assigned to the zone) is preset, and the set value is a coefficient for use in changing the area per user 99 that is assigned to each zone. For instance, the maximum capacity of a zone is 10 persons, and an assumed unit area per user to be assigned in a basic state is 1 m$^2$. Supposing that the set value at this time is 1.0, the area of the zone is 10 persons×1 m2×1.0=10 m$^2$. At this time, when the set value is updated to 1.5, the area of the zone is changed to 10 persons×1 m2×1.5=15 m$^2$.

For instance, when an infectious disease becomes an epidemic, the manager of, for example, zone assignment system 300 can suppress the infectious disease from spreading, by updating the set value to a larger value to keep the appropriate distance between users 99 inside the zone. Furthermore, if it becomes necessary to temporarily accommodate a large number of people because of hiring of a large number of new employees, the manager of, for example, zone assignment system 300 updates the set value to a smaller value, which enables more users 99 to be accommodated inside the zone. However, when the area of the zone is changed in this way, the number of the zones of space 500 may be changed.

Figure 4:
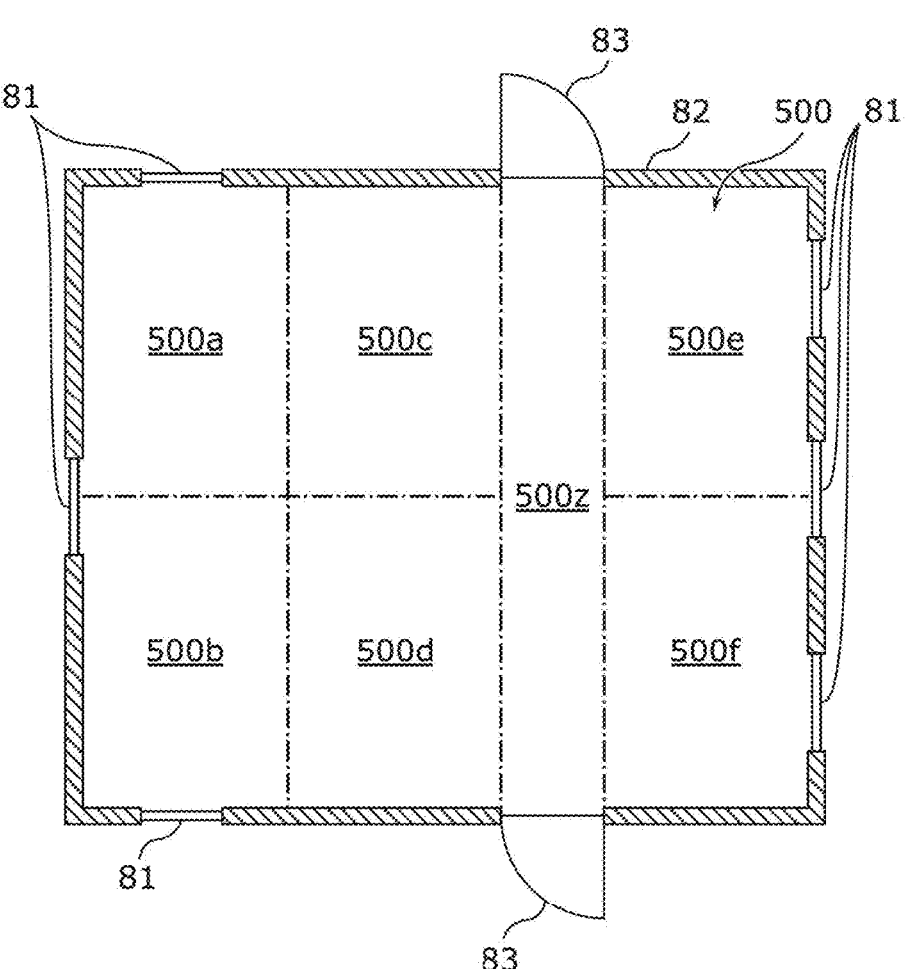
FIG. 4 is a plan view for explaining about determination of the areas of zones by the zone assignment system according to the embodiment.

FIG. 4 is a plan view for explaining about determination of the areas of zones by the zone assignment system according to the embodiment. FIG. 4 illustrates space 500 in which the set value is 1.5 times the set value used in FIG. 2. When the set value becomes 1.5 times larger, the area of each zone becomes 1.5 times larger. Meanwhile, the number of the zones of space 500 becomes two thirds the number of zones illustrated in FIG. 2, that is, six zones. In this way, when the area of each zone is changed, the larger the area of each zone, the smaller the number of the zones of space 500. Meanwhile, when the smaller the area of each zone, the larger the number of zones of space 500.

Weather obtainer 55 illustrated in FIG. 3 is a processing unit that obtains information on the weather at the target date and time at which to assign zones, from a weather information server that is a kind of external server 600. In the weather information server, information regarding the weather at a particular location (including at least one of the longitude or the latitude) at each date and time is stored as a database. Weather obtainer 55 obtains information on the relevant weather from information indicating the location of space 500 (including at least one of the longitude, the latitude, or the altitude) and information indicating the target date and time at which to assign zones. The information on the weather described here includes information on the temperature at the location of space 500 and information on the sunshine duration and the sun altitude. The sunshine duration described here means a period of time in which sunlight actually reaches the ground surface when cloud conditions are taken into consideration.

Communicator 56 is a processing unit that controls operation of a communication module when schedule obtainer 51, set value obtainer 53, and weather obtainer 55 perform communication to obtain information.

Energy consumption calculator 57 is a processing unit that calculates the amount of energy consumption expected to be consumed in each of the zones when users 99 use the zones at the target date and time at which to assign zones. Energy consumption calculator 57 estimates the outside light to be taken in through windows 81 from the sun altitude and sunshine duration at the target date and time at which to assign zones. Then, in consideration of the estimated value of the outside light, energy consumption calculator 57 calculates the amount of energy expected to be consumed to operate the lighting device at the load (on the basis of the luminance) necessary to maintain the illuminance at feet of users 99 inside the zone at, for example, 300 lux or higher and to maintain the illuminance at hands of users 99 at, for example, 500 lux or higher.

Furthermore, energy consumption calculator 57 estimates, from the temperature at the target date and time at which to assign zones, the amount of heat to be taken in from the outside air through windows 81. Then, in consideration of the estimated value of the amount of the heat, energy consumption calculator 57 calculates the amount of energy expected to be consumed to operate the air-conditioning device at the load necessary to maintain the temperature inside the zone at a predetermined temperature. The predetermined temperature is an appropriately set temperature value. For instance, the predetermined temperature in the winter is, for example, 18 degrees Celsius, whereas the predetermined temperature in the summer is, for example, 28 degrees Celsius. Furthermore, energy consumption calculator 57 may calculate energy consumption required to operate the ventilating device in addition to the energy consumption required to operate the above air-conditioning device. Energy consumption calculator 57 estimates, from the temperature at the target date and time at which to assign zones, the amount of heat to be taken in from the outside air, which is intake air, when the zone is ventilated to equalize the $CO_2$ concentration within the zone. Then, energy consumption calculator 57 may calculate energy consumption expected to be consumed to operate the air-conditioning device at the load necessary to maintain the temperature inside the zone at the predetermined temperature, in consideration of the total amount of heat to be taken in including the estimated value of the amount of heat to be taken in by ventilation and the estimated value of the amount of heat to be taken in from the outside air through the windows.

Assigner 58 is a processing unit that assigns each user 99 a zone to use out of the zones, in accordance with the obtained usage schedules and the calculated amount of energy consumption of each zone. Assigner 58 identifies users 99 who are scheduled to use space 500 at the target date and time at which to assign zones, and divides identified users 99 into groups according to the intended use of space 500 by each user 99. Then, the same zone is assigned to users 99 who share the same intended use of space 500.

It should be noted that if for instance the number of users 99 who share the same intended use of the space exceeds the number of persons that can be accommodated in one zone, two or more zones are assigned to users 99 who share the same intended use of the space. Here, the way of assigning the two or more zones is not limited to a particular way. One of the two or more zones may be assigned to users 99 equal in number to the capacity of the one of the two or more zones, and another zone of the two or more zones may be assigned to the rest of users 99. Alternatively, users 99 who share the same intended use of the space may be equally divided into groups equal in number to the two or more zones, and each group may be assigned a different one of the two or more zones. Furthermore, two zones assigned to users 99 who share the same intended use of the space may be adjacent zones or be spaced apart from each other.

Furthermore, when users 99 with an intended use of the space different from that of users 99 who are assigned one of the zones are assigned another zone, assigner 58 performs assignment so that the other zone to be assigned is not adjacent to the one of the zones. Here, the one zone and the other zone are to be used by users 99 with different intended uses of the space. Thus, assigner 58 performs zone assignment so that the one zone and the other zone are spaced apart from each other.

In this way, assigner 58 assigns an appropriate zone out of the zones to each of two or more users 99 who are scheduled to use the space for two or more different intended uses. Here, assigner 58 selects two or more zones to be assigned so that the total value of energy consumption is relatively small. Specifically, assigner 58 selects a zone combination that satisfies the condition that the total value of the amounts of energy consumption is relatively small when the total value of the amounts of energy consumption to be consumed in the zones of a combination made up of non-adjacent two (or more) zones is calculated from the amount of energy consumption in each zone calculated by energy consumption calculator 57. For instance, assigner 58 assigns each of users 99 a zone of a zone combination in which the total value of the amounts of energy consumption is less than a threshold. The threshold may be a numerical value set as an indicator by the management company of a building in which space 500 is located, may be, for example, a target value that a municipality sets in an effort to decrease the use of energy, or may be a set value relative to the amount of energy consumption consumed in the past by using space 500.

Furthermore, assigner 58 may assign users 99 the zones of the zone combination that has the total value of the amounts of energy consumption less than that of any other combinations, that is, the smallest total value of the amounts of energy consumption, among the combinations that satisfy the condition of non-adjacent two (or more) zones.

Furthermore, assigner 58 assigns as below the rest of the zones, which are not the one zone or the other zone.

(1) Interaction Zone

Assigner 58 assigns one or more interaction zones to one or more zones of the rest of the zones. The interaction zone is used, for example, when users 99 take a break, and is a zone where users 99 using the space for different intended uses can communicate with one another. Thus, a situation occurs in which users using the space for different intended uses use the interaction zone at the same time. Furthermore, by making it a precondition that users 99 have conversations in the interaction zone, the interaction zone is assigned to one zone of the rest of the zones that is spaced apart from both of a solowork zone for business use and a group work zone for business use. For instance, the interaction zone is assigned to the zone that has the smallest amount of energy consumption among the rest of the zones, and the interaction zone can be used at a given timing by users 99 who are assigned the other zones. That is, each user 99 can use the interaction zone in addition to the zone assigned to the user. It should be noted that two or more interaction zones may be assigned, or the interaction zone need not be assigned. For instance, in a case where a fixed space similar to the interaction zone is provided for the purpose of interaction between users 99 in a common space different from space 500, it may not be necessary to assign an interaction zone whose location is irregularly changed.

In the interaction zone, devices, such as an air-conditioning device and a ventilating device that take time from when operation starts until the effects of the devices are provided, are constantly operating. However, regarding devices such as a lighting device and an audio device that can provide effects immediately after switching between on and off, on-off control may be performed according to the presence or absence of users 99 in the interaction zone.

(2) Alternative Zone and Unavailable Zone

When, in space 500, an interaction zone is assigned from among the rest of the zones, assigner 58 assigns an alternative zone or an unavailable zone to each of all the unassigned zones except for the interaction zone. In this way, space 500 includes the zones assigned to users 99, the interaction zone, the alternative zone, and the unavailable zone and no longer includes unassigned zones.

The alternative zone is, for example, a zone that becomes available when one or more of users 99 who are each assigned a zone of space 500 request a change of the zone. That is, the alternative zone is a zone that user 99 is allowed to use instead of the zone assigned to user 99. Users 99 may include user 99 who wants to work in a fixed zone. By accepting such a request under a certain rule, the work efficiency of user 99 who wants to work in the fixed zone is expected to improve. As the certain rule, for instance, a zone with relatively small energy consumption may be set. Thus, for instance, when the alternative zone is actually used, it is possible to avoid the total value of energy consumption in the entirety of space 500 significantly increasing.

As an example, the following rule may be set: the amount of energy consumption in the alternative zone is less than 10% of the total of the amounts of energy consumption in all zones being used by users 99 at the target date and time at which to assign the zones among the zones. For instance, zone 500*a* and zone 500*b* are assigned to users 99 who intend to use the space for solowork, zone 500*g* is assigned to users 99 who intend to use the space for group work, and an interaction zone is assigned to zone 500*f*. Here, when the alternative zone is assigned to zone 500*d*, the amount of energy consumption in zone 500*d* is the numerical value of 10% of the total value of the amounts of energy consumption in zone 500*a*, zone 500*b*, zone 500*f*, and zone 500*g*. Thus, a possibility of an alternative zone being assigned from among the unassigned zones increases with an increase in the number of zones being used.

Unlike the zone permissible zone described above, the unavailable zone is a zone that users 99 are not allowed to use even if one or more of users 99 who are each assigned a zone of space 500 request a change of the zone. That is, the unavailable zone is a zone that user 99 is not allowed to use instead of the zone assigned to the user. The unavailable zone is a zone that can give at least certain effects on an increase in the total value of the energy consumption in the entirety of space 500. Accordingly, it can be said that energy consumption in the alternative zone is less than that in the unavailable zone.

The alternative zone and the unavailable zone need not be notified to users 99. If the alternative zone was notified in advance, many users 99 who request a change may appear, which may lead to a situation in which space 500 cannot be appropriately used. If the unavailable zone was notified in advance, it would make it possible for users 99 to guess the alternative zone, which may lead to a similar situation.

Thus, if user 99 wants to use the alternative zone, user 99, for instance, ignores the zone assigned to user 99 and starts using one of the unassigned zones. Then, zone assignment system 300 detects that user 99 started using the unassigned zone. If the zone is an alternative zone, assigner 58 changes the zone assigned to user 99 to the zone actually being used by user 99. If the zone is an unavailable zone, assigner 58 makes a notification to instruct user 99 to move to the zone assigned to user 99.

It should be noted that the operation of, for example, assigner 58 regarding the change of the zone is just an example. For instance, at least one of the alternative zone or the unavailable zone may be presented to each user 99, and the input of a prior change request may be accepted from user 99.

Outputter 59 is a processing unit that outputs the assignment result indicating the assigned zone. For instance, outputter 59 outputs the assignment result to terminal device 400 of user 99. Then, for instance, display 61 of terminal device 400 displays the location of the zone assigned to user 99 and the location of the interaction zone. It should be noted that the location of the zone is, for example, the seat numbers of seats belonging to each zone or map information inside the space and includes information that enables user 99 to spot the assigned zone under the circumstances without a physical boundary. Then, just using of the displayed zone by each user 99 enables appropriate use of space 500.

Operation

Operation of zone assignment system 300 in the embodiment is described below with reference to FIG. 5. FIG. 5 is a flowchart illustrating an example of operation of the zone assignment system according to the embodiment.

It should be noted that prior to the various operations described below, environment control devices in all zones inside space 500 may start operating. This is because, in a case where users 99 start using zones immediately after zone assignment, the effects of some of the devices, such as an air-conditioning device and a ventilating device may not have been obtained yet. Thus, the environment control devices in all zones may be caused to start operating in advance, and after the zone assignment, operation of environment control devices in zones currently not being used (e.g., the alternative zone that no users 99 requested to use instead of the assigned zone and an unavailable zone) may be sequentially stopped. However, the zone assignment has been completed in advance, and there is enough time before users 99 start using zones (enough time to obtain the effects of the devices). In such a case, there is no need to start operating the environment control devices in advance.

As illustrated in FIG. 5, set value obtainer 53 reads out and obtains a set value stored in, for example, memory (S101). Zone assignment system 300 determines the area values of the zones on the basis of the obtained set value (S102). Thus, the location of each zone inside space 500 is determined. Energy consumption calculator 57 calculates the amounts of energy consumption expected to be consumed when the determined zones are used at a target date and time at which to assign the zones (S103).

Then, schedule obtainer 51 obtains usage schedules entered in advance by users 99 (S104). Assigner 58 assigns each user 99 a zone to be used by the user, in accordance with the amounts of energy consumption in the respective zones calculated by energy consumption calculator 57 and the usage schedules obtained by schedule obtainer 51 (S105). In addition, assigner 58 assigns one or more interaction zones to one or more zones of the rest of the zones that remain unassigned after zones are assigned to users 99 (S106). By outputting the result of assignment, outputter 59 causes terminal device 400 or another device of each user 99 to display the result of assignment (S107).

Here, zone assignment system 300 detects a change of a usage zone by one or more users 99 out of users 99 (S108). For instance, zone assignment system 300 may detect usage of an unassigned zone by using, for example, sensors provided in the unassigned zones including an alternative zone and an unavailable zone. Alternatively, zone assignment system 300 may detect login information from a PC at a seat belonging to an unassigned zone. After detecting the change of the usage zone (Yes in S108), zone assignment system 300 determines whether the unassigned zone being used is an alternative zone (S109). When determining that the unassigned zone being used is not an alternative zone (that is, the unassigned zone being used is an unavailable zone) (No in S109), zone assignment system 300 makes the notification of prohibition of changing the zone, to user 99 who is attempting to change the zone (S110). It should be noted that in order to identify user 99 who is attempting to change the zone, a system such as a face authentication system may be used, or login information obtained from, for example, a PC at a seat may be used. Meanwhile, when determining that the unassigned zone being used is an alternative zone (Yes in S109), zone assignment system 300 changes the usage zone assigned to user 99 (S111). That is, zone assignment system 300 newly assigns user 99 the unassigned zone being used by user 99, that is, the zone that user 99 intends to use instead of the zone assigned to user 99. Then, zone assignment system 300 outputs a control signal to maintain operation of the environment control devices in the zones being used by users 99 and an interaction zone and to stop operation of the environment control devices in the other zones (S112). Here, the zones being used include the alternative zone newly assigned to user 99 by the change.

By assigning users 99 zones in the above manner, it is possible to use space 500 appropriately in terms of energy consumption while maintaining smooth performance of tasks by users 99.

Effects

As described above, zone assignment system 300 according to the embodiment is a zone assignment system that assigns one of the plurality of zones of space 500 to each of users 99 before users 99 start using the space. Zone assignment system 300 includes: schedule obtainer 51 (hereinafter referred to as the obtainer) that obtains the usage schedules of users 99 each indicating a date and time at which user 99 is scheduled to use space 500 and the intended use of space 500 by user 99; assigner 58 that assigns the user a zone to use out of the plurality of zones, based on the usage schedules obtained; and outputter 59 that outputs an assignment result indicating the zone assigned. With regard to a target date and time at which to assign the zone, assigner 58 assigns a first zone out of the plurality of zones to a user, among the users, who has a usage schedule indicating a date and time overlapping the target date and time at which to assign the zone and indicating a first intended use as the intended use, and assigner 58 assigns a second zone out of the plurality of zones to a user, among the users, who has a usage schedule indicating a date and time overlapping the target date and time at which to assign the zone and indicating, as the intended use, a second intended use different from the first intended use, the second zone being a zone not adjacent to the first zone.

Zone assignment system 300 can assign the first zone to the user of the first intended use and the second zone to the user of the second intended use and let the users use different portions of space 500, the first intended use being different from the second intended use, the second zone being spaced apart from the first zone. As a result, it is possible to suppress physical effects, such as utterance voices, from being given from the user of the first intended use to the user of the second intended use or from the user of the second intended use to the user of the first intended use. It is possible to divide space 500 into zones in terms of the intended uses of space 500, and let the users use the zones. By gathering users who share the same intended use of space 500 at one zone in this way, only some portions of space 500 are used by the users, which makes it possible to save, for example, energy that would have been consumed in the other portions. Thus, the space can be used more appropriately.

For instance, zone assignment system 300 may further include: energy consumption calculator 57 that calculates the amount of energy consumption expected to be consumed in each of the plurality of zones when the users use the plurality of zones at the target date and time at which to assign the zone. Assigner 58 may assign the first zone and the second zone in accordance with the amount of energy consumption expected to be consumed in each of the plurality of zones.

Thus, the first zone and the second zone can be assigned in consideration of differences in the amounts of energy consumption expected to be consumed in the plurality of zones.

For instance, assigner 58 may assign, one as the first zone and the other as the second zone, zones that form a combination having the smallest total of the amounts of energy consumption out of the plurality of zones, the amounts of energy consumption each being the amount of energy consumption.

Thus, it is possible to assign the first zone and the second zone that form a combination having the smallest total of the amounts of energy consumption among the combinations made from the amounts of energy consumption to be consumed in the plurality of zones.

For instance, assigner 58 may assign, one as the first zone and the other as the second zone, zones that form a combination having the total of the amounts of energy consumption less than a threshold out of the plurality of zones, the amounts of energy consumption each being the amount of energy consumption.

Thus, it is possible to assign the first zone and the second zone that form a combination in which the total of the amounts of energy consumption is less than a threshold among combinations made from the amounts of energy consumption to be consumed in the plurality of zones.

For instance, the amount of energy consumption may include the amount of energy consumption expected to be consumed to operate a lighting device that controls lighting in the zone.

Thus, the first zone and the second zone can be assigned in consideration of differences in the amounts of energy consumption expected to be consumed to operate the lighting devices that control lighting in the plurality of zones.

For instance, energy consumption calculator 57 may calculate the amount of energy consumption expected to be consumed to operate the lighting device, based on the amount of outside light to be taken in according to the weather at the location of space 500 at target date and time at which to assign the zone.

Thus, the first zone and the second zone can be assigned in consideration of differences in the amounts of energy consumption expected to be consumed to operate the lighting devices that control the lighting in the plurality of zones, the amounts of energy consumption being calculated on the basis of the amount of outside light to be taken in according to the weather at the location of space 500 at the target date and time at which to assign the zone.

For instance, the amount of energy consumption may include the amount of energy consumption expected to be consumed to operate an air-conditioning device that controls the flow of air in the zone.

Thus, the first zone and the second zone can be assigned in consideration of differences in the amounts of energy consumption expected to be consumed to operate the air-conditioning devices that control the flow of air in the plurality of zones.

For instance, energy consumption calculator 57 may calculate the amount of energy consumption expected to be consumed to operate the air-conditioning device, based on the amount of heat to be taken in from outside air according to the weather at the location of space 500 at the target date and time at which to assign the zone.

Thus, the first zone and the second zone can be assigned in consideration of differences in the amounts of energy consumption expected to be consumed to operate the air-conditioning devices that control the flow of air in the plurality of zones, the amounts of energy consumption being calculated on the basis of the amount of heat to be taken in from the outside air according to the weather at the location of space 500 at the target date and time at which to assign the zone.

For instance, a third zone may be further set as a zone that the user assigned the first zone and the user assigned the second zone are allowed to use in addition to the zone assigned to the user, the third zone being selected from among the plurality of zones in accordance with the amount of energy consumption expected to be consumed in each of the plurality of zones at the target date and time at which to assign the zone.

Thus, the appropriate third zone can be set in accordance with the amounts of energy consumption, and the user assigned the first zone and the user assigned the second zone can use the third zone in addition to the zone assigned to the user.

For instance, among the plurality of zones, one or more zones not assigned as the first zone or the second zone may include at least one of: an alternative zone that at least one of the user assigned the first zone or the user assigned the second zone is allowed to use instead of the zone assigned to the user; or an unavailable zone that the user assigned the first zone and the user assigned the second zone are not allowed to use instead of the zone assigned to the user, and the amount of energy consumption in the alternative zone may be less than the amount of energy consumption in the unavailable zone.

Thus, the users are allowed to use the alternative zone out of the unassigned zones according to their preferences, which can contribute to improvement in usability. Furthermore, by suppressing usage of the unavailable zone that would, if used, significantly affect the energy consumption in the entirety of space 500, it is possible to suppress the energy consumption from becoming an enormous amount while improving usability.

For instance, the amount of energy consumption in the alternative zone may be less than 10% of the total of the amount of energy consumption in every zone being used by the users at the target date and time at which to assign the zone, among the plurality of zones.

Thus, by suppressing the usage of the unavailable zone that would, if used, affect at least 10% of the energy consumption in the entirety of space 500, it is possible to suppress the energy consumption from becoming an enormous amount while improving usability.

For instance, zone assignment system 300 may further include: set value obtainer 53 that obtains a set value regarding the area of each of the plurality of zones, in which each of the plurality of zones has an area calculated as the product of the total number of persons set as the capacity of the zone, a unit area per user, and the set value obtained.

Thus, it is possible to adjust the area per user in each zone (that is, user density) on the basis of the set value obtained by set value obtainer 53.

Furthermore, the zone assignment method according to the embodiment is a zone assignment method for assigning one of the plurality of zones of space 500 to each of users before the users start using space 500. The zone assignment method includes: obtaining usage schedules of the users each indicating a date and time at which the user is scheduled to use the space and the intended use of the space by the user (S104); assigning the user a zone to use out of the plurality of zones, based on the usage schedules obtained (S105); and outputting an assignment result indicating the zone assigned (S107). In the assigning, with regard to a target date and time at which to assign the zone, a first zone out of the plurality of zones is assigned to a user, among the users, who has a usage schedule indicating a date and time overlapping the target date and time at which to assign the zone and indicating a first intended use as the intended use, and a second zone out of the plurality of zones is assigned to a user, among the users, who has a usage schedule indicating a date and time overlapping the target date and time at which to assign the zone and indicating, as the intended use, a second intended use different from the first intended use, the second zone being a zone not adjacent to the first zone.

By using the above zone assignment method, it is possible to obtain effects similar to those obtained in zone assignment system 300 described above.

For instance, the recording medium according to the embodiment is a non-transitory computer-readable recording medium having recorded thereon a program for causing a computer to execute the zone assignment method described above.

Thus, by using the computer, it is possible to obtain effects similar to those obtained in zone assignment system 300 described above.

Other Embodiments

The zone assignment system and the zone assignment method according to the present disclosure are described above on the basis of the above embodiment. However, the present disclosure is not limited to the above embodiment.

Furthermore, in the above embodiment, processing performed by a particular processing unit may be performed by another processing unit. Furthermore, the order of processing tasks may be changed, or some of the processing tasks may be performed in parallel. Furthermore, the way of dividing the structural elements of the zone assignment system among the devices is just an example. For instance, the structural elements of one device may be included in another device.

For instance, the processing described in the above embodiment may be achieved by performing central processing using a single device (system) or by performing distributed processing using devices. Furthermore, the processor that executes the above program may be one processor or a plurality of processors. That is, the central processing or distributed processing may be performed.

Furthermore, in the above embodiment, all of or some of the structural elements, such as a controller, may be dedicated hardware or may be achieved by executing a software program suitable for each structural element. Each structural element may be achieved by a program executer, such as a central processing unit (CPU) or a processor, reading and executing the software program stored in a recording medium, such as an HDD or semiconductor memory.

Furthermore, a structural element such as the controller may be one electronic circuit or a plurality of electronic circuits. The one electronic circuit or each of the plurality of electronic circuits may be a general-purpose circuit or a dedicated circuit.

The one electronic circuit or the plurality of electronic circuits may include, for example, a semiconductor device, an IC, or an LSI. The IC or the LSI may be integrated into one chip or a plurality of chips. Here, an integrated circuit is referred to as an IC or an LSI. However, according to the level of integration, an integrated circuit may be referred to as a system LSI, a very-large-scale integration (VLSI), or an ultra-large-scale integration (ULSI). Furthermore, a FPGA that is programmed after manufacturing the LSI can be also used for the same purpose.

Furthermore, general or specific aspects of the present disclosure may be embodied as a system, a device, a method, an integrated circuit, or a computer program. Alternatively, the general or specific aspects of the present disclosure may be embodied as an optical disc in which the computer program is stored, or a non-transitory computer-readable recording medium such as an HDD or semiconductor memory. Furthermore, the general or specific aspects of the present disclosure may be embodied by any combination of the system, device, method, integrated circuit, computer program, and recording medium.

The present disclosure includes one or more embodiments achieved by making various changes envisioned by those skilled in the art to each embodiment and one or more embodiments achieved by any combination of the structural elements and the functions according to the embodiment within the scope of the present disclosure.

REFERENCE SIGNS LIST 11a first lighting device (lighting device)
11b second lighting device (lighting device)
13a first air-conditioning device (air-conditioning device)
13b second air-conditioning device (air-conditioning device)
51 schedule obtainer (obtainer)
53 set value obtainer
57 energy consumption calculator
58 assigner
59 outputter
99 user
300 zone assignment system
500 space
500a, 500b, 500c, 500d, 500e, 500f, 500g, 500h, 500i zone
500z passage
600 external server

The invention claimed is:

1. A zone assignment system that assigns one of a plurality of zones of a space to each of a plurality of users before the plurality of users start using the space, the zone assignment system comprising a processor configured to perform operations comprising:

obtaining usage schedules of the plurality of users each indicating a date and time at which a user is scheduled to use the space and an intended use of the space by the user;

assigning the user a zone, as an assigned zone, to use out of the plurality of zones, based on the usage schedules obtained; and outputting an assignment result indicating the assigned zone, wherein with regard to a target date and time at which to assign the zone, the operations comprise:

assigning a first zone out of the plurality of zones to a first user, among the plurality of users, who has a usage schedule indicating a date and time overlapping the target date and time at which to assign the zone and indicating a first intended use as the intended use and assigning a second zone out of the plurality of zones to a second user, among the plurality of users, who has a usage schedule indicating a date and time overlapping the target date and time at which to assign the zone and indicating, as the intended use, a second intended use different from the first intended use, the second zone being a zone not adjacent to the first zone, when a total number of first users assigned the first zone reaches a capacity of the first zone, a third zone is assigned to one or more third users included in the first users, the third zone being one of the plurality of zones and being adjacent to the first zone, the first intended use includes an intended use of individual work, and the second intended use includes an intended use of group work, and the operations further comprise transmitting a control signal to an environment control device provided in the assigned zone to control a spatial environment of the assigned zone based on the assignment result, the environment control device including at least one of a lighting device, a ventilating device, or an air-conditioning device, wherein at least one of the lighting device, the ventilating device, or the air-conditioning device is operated based on the control signal.

2. The zone assignment system according to claim 1, wherein the operations comprise calculating an amount of energy consumption expected to be consumed in each of the plurality of zones when the plurality of users use the plurality of zones at the target date and time at which to assign the zone, and assigning the first zone and the second zone in accordance with the amount of energy consumption expected to be consumed in each of the first zone and the second zone.

3. The zone assignment system according to claim 2, wherein the amount of energy consumption includes an amount of energy consumption expected to be consumed to operate the lighting device that controls lighting in the zone.

4. The zone assignment system according to claim 3, wherein the calculating the amount of energy consumption comprises calculating the amount of energy consumption expected to be consumed to operate the lighting device, based on an amount of outside light to be taken in according to weather at a location of the space at the target date and time at which to assign the assigned zone.

5. The zone assignment system according to claim 2, wherein the amount of energy consumption includes an amount of energy consumption expected to be consumed to operate the air-conditioning device that controls flow of air in the assigned zone.

6. The zone assignment system according to claim 5, wherein the calculating the amount of energy consumption comprises calculating the amount of energy consumption expected to be consumed to operate the air-conditioning device, based on an amount of heat to be taken in from outside air according to weather at a location of the space at the target date and time at which to assign the assigned zone.

7. The zone assignment system according to claim 2, wherein among the plurality of zones, one or more zones not assigned as the first zone or the second zone include at least one of:

an alternative zone that is usable instead of the first zone or the second zone assigned to at least one of the first user or the second user; or an unavailable zone that is not allowed to be used instead of the first zone or the second zone assigned to the first user or the second user, and the amount of energy consumption in the alternative zone is less than the amount of energy consumption in the unavailable zone.

8. The zone assignment system according to claim 7, wherein the amount of energy consumption in the alternative zone is less than 10% of a total of the amount of energy consumption in every zone being used by the plurality of users at the target date and time at which to assign the zone, among the plurality of zones.

9. The zone assignment system according to claim 2, wherein the operations comprise assigning, one as the first zone and another as the second zone, zones that form a combination having a smallest total of amounts of energy consumption out of the plurality of zones, the amounts of energy consumption each being the amount of energy consumption.

10. The zone assignment system according to claim 2, wherein the operations comprise assigning, one as the first zone and another as the second zone, zones that form a combination having a total of amounts of energy consumption less than a threshold out of the plurality of zones, the amounts of energy consumption each being the amount of energy consumption.

11. The zone assignment system according to claim 2, wherein the operations further comprise assigning a fourth third zone is further set as a zone that is usable in addition to the first zone or the second zone assigned to the first user or the second user, the third fourth zone being selected from among the plurality of zones in accordance with the amount of energy consumption expected to be consumed in each of the plurality of zones at the target date and time at which to assign the assigned zone.

12. The zone assignment system according to claim 1, wherein the operations comprise obtaining a set value regarding an area of each of the plurality of zones, and each of the plurality of zones has an area calculated as a product of a total number of persons set as a capacity of the zone assigned, a unit area per user, and the set value obtained.

13. A zone assignment method for assigning one of a plurality of zones of a space to each of a plurality of users before the plurality of users start using the space, the zone assignment method comprising:

obtaining usage schedules of the plurality of users each indicating a date and time at which a user is scheduled to use the space and an intended use of the space by the user;

assigning the user a zone, as an assigned zone, to use out of the plurality of zones, based on the usage schedules obtained; and outputting an assignment result indicating the assigned zone, wherein in the assigning, with regard to a target date and time at which to assign the zone, a first zone out of the plurality of zones is assigned to a first user, among the plurality of users, who has a usage schedule indicating a date and time overlapping the target date and time at which to assign the zone and indicating a first intended use as the intended use, and a second zone out of the plurality of zones is assigned to a second user, among the plurality of users, who has a usage schedule indicating a date and time overlapping the target date and time at which to assign the zone and indicating, as the intended use, a second intended use different from the first intended use, the second zone being a zone not adjacent to the first zone, when a total number of first users assigned the first zone reaches a capacity of the first zone, a third zone is assigned to one or more third users included in the first users, the third zone being one of the plurality of zones and being adjacent to the first zone, the first intended use includes an intended use of individual work, and the second intended use includes an intended use of group work, and the method comprises transmitting a control signal to an environment control device provided in the assigned zone to control a spatial environment of the assigned zone based on the assignment result, the environment control device including at least one of a lighting device, a ventilating device, or an air-conditioning device, wherein at least one of the lighting device, the ventilating device, or the air-conditioning device is operated based on the control signal.

14. A non-transitory computer-readable recording medium having recorded thereon a program for causing a computer to execute the zone assignment method according to claim 13.

\* \* \* \* \*